(12) United States Patent
Spießl et al.

(10) Patent No.: US 12,534,388 B2
(45) Date of Patent: Jan. 27, 2026

(54) FILTRATION DEVICE FOR A WATER-BEARING HOUSEHOLD APPLIANCE

(71) Applicant: emz-Hanauer GmbH & Co. KGaA, Nabburg (DE)

(72) Inventors: Georg Spießl, Altendorf (DE); Manfredi Signorino, Wackersdorf (DE); Benjamin Schemela, Schwarzenbach (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 240 days.

(21) Appl. No.: 18/441,056

(22) Filed: Feb. 14, 2024

(65) Prior Publication Data
US 2024/0270604 A1 Aug. 15, 2024

(30) Foreign Application Priority Data
Feb. 14, 2023 (DE) .......................... 102023103570.3

(51) Int. Cl.
C02F 1/00 (2023.01)
C02F 101/32 (2006.01)
C02F 103/00 (2006.01)

(52) U.S. Cl.
CPC .......... C02F 1/001 (2013.01); C02F 2101/32 (2013.01); C02F 2103/002 (2013.01); C02F 2201/002 (2013.01); C02F 2307/12 (2013.01)

(58) Field of Classification Search
CPC ....................................................... C02F 1/001
See application file for complete search history.

(56) References Cited

U.S. PATENT DOCUMENTS

| 2010/0084324 A1 | 4/2010 | Geisbauer |
| 2020/0230530 A1 | 7/2020 | Levitt et al. |
| 2020/0316501 A1 | 10/2020 | Jones |
| 2022/0008845 A1 | 1/2022 | Girondi |

FOREIGN PATENT DOCUMENTS

| CN | 112210967 A | 1/2021 |
| DE | 102020200685 A1 | 7/2021 |
| EP | 3907322 A1 | 11/2021 |
| EP | 4148178 A1 | 3/2023 |
| WO | 2019081013 A1 | 5/2019 |
| WO | 2022118034 A1 | 6/2022 |

*Primary Examiner* — Jason Y Ko
(74) *Attorney, Agent, or Firm* — Tarolli, Sundheim, Covell & Tummino LLP (57) ABSTRACT

The invention relates to a filtration device, in particular for the filtration of microplastics for a water-bearing household appliance, wherein the filtration device comprises a housing in which a filter element is arranged, wherein the filter element is designed in such a way that it encloses an inner cavity which is fluidically connected to a supply line element, wherein a first drain element is arranged along the height axis Z above the filter element, wherein a second drain element is arranged along the height axis Z below the filter element.

11 Claims, 9 Drawing Sheets

FILTRATION DEVICE FOR A WATER-BEARING HOUSEHOLD APPLIANCE

CROSS-REFERENCE TO RELATED APPLICATION(S)

This patent application claims the benefit of and priority to German Patent Application No. 102023103570.3, filed on Feb. 14, 2023, which is herein incorporated by reference in its entirety.

FIELD OF THE DISCLOSURE

The invention relates to a filtration device, in particular for the filtration of microplastics, for a water-bearing household appliance, wherein the filtration device comprises a housing. Furthermore, the invention relates to a water-bearing household appliance with a filtration device, in particular for the filtration of microplastics.

BACKGROUND

Microplastics are solid, insoluble, particulate, and non-biodegradable synthetic substances or plastics. The microplastic particles have a size in the micrometer or nanometer regime. Microplastics are ingredients in detergents, soaps etc.

SUMMARY

When washing synthetic textiles or items of clothing, synthetic textile components are dissolved into the smallest synthetic fibers. The unfiltered microplastic particles and fibers have a considerable harmful impact on aquatic flora and fauna and thus also on humans as part of the food chain. Water-bearing household appliances are therefore equipped with filter devices. However, these are often unable to effectively remove microplastic particles and fibers. More effective filters, on the other hand, have the disadvantage that they clog quickly and therefore require considerable maintenance.

The task of the invention is to provide improved filtration, in particular, for the filtration of microplastics for water-bearing household appliances.

The problem is solved by the objects of claims 1 and 9. The subclaims comprise preferred embodiments.

According to the invention, a filtration device is provided, in particular for the filtration of microplastics for a water-bearing household appliance, wherein the filtration device comprises a housing in which a filter element is arranged, wherein the filter element is designed in such a way that it encloses an inner cavity which is fluidically connected to a supply line element, wherein a first drain element is arranged along the height axis Z above the filter element, wherein a second drain element is arranged along the height axis Z below the filter element.

One such water-bearing household appliance is a washing machine. However, an application in water treatment systems and professional solutions would also be conceivable. In the following, without limitation to the general public, the invention is limited to a household appliance in the form of a washing machine. An embodiment according to the invention achieves effective filtering of microplastic particles and fibers.

According to a particularly preferred embodiment, the first drain element is suitable and intended to drain the filtered water only during a pumping process of the household appliance. Preferably, the second drain element is suitable and intended to drain the filtered water only after the end of a pumping process of the household appliance. During the advantageous pumping process, the water enters the filtration device and thus the inner cavity. As the water passes through the filter element, the microplastic particles and fibers remain in the inner cavity. The water exits the filter element upwards along the height axis Z and thus reaches the first drain element, through which it then exits the filtration device. At the end of the pumping process, no water or only a small amount of return water enters the filtration device. Due to the effect of the gravitational force, the remaining water exits the filter element downwards along the height axis Z and is then channeled out of the filtration device through the second drain element. In the process, the filtered microplastic particles and fibers collect inside the filter element on a lower inner surface.

According to another preferred embodiment, the filter element is essentially hollow-cylindrical in shape. Preferably, the filter element has an essentially circular cross-section. However, other differently shaped cross-sections would also be conceivable, for example elliptical, square, rectangular, triangular or another polygonal shape. Preferably, the filter element has a carrier structure on which at least one filter screen is arranged. Advantageously, the filter screen forms a closed cylindrical shell. Advantageously, the carrier structure is designed as a ribbed structure. It is advantageous that the ribbed elements associated with the ribbed structure are arranged on an outer surface of the filter screen.

According to a further preferred embodiment, an inner element extending along a longitudinal axis X is arranged rotatably within the inner cavity. Preferably, the inner element contacts, at least in sections, an inner surface of the at least one filter screen. Advantageously, filtered microplastic particles and fibers are collected by rotating the inner element. The preferred circular cross-section of the filter element favors rotation of the inner element along an inner surface of the filter screen.

According to a further preferred embodiment, the inner element comprises two angled elements extending along the longitudinal axis X. Furthermore, a gap is preferably provided between the two angled elements. Preferably, the inner element separates an inner cavity into an upper area and a lower area. Advantageously, during the pumping process, the majority of the microplastic particles and fibers are located in an upper area of the inner cavity. At the end of the pumping process, the microplastic particles and fibers enter the lower area of the inner cavity. The design of the angled elements advantageously provides a kind of guide for the microplastic particles and fibers towards the gap. Due to the design of the inner element, only a small part of the lower area of the inner cavity will leave it again during a further pumping process.

Advantageously, the inner element comprises a lip element which contacts an inner surface of the filter screen. Furthermore, it is advantageous that a first outer element of the filter element is arranged rotatably on the housing of the filtration device. Preferably, the first outer element is connected to the inner element in such a way that the latter can be rotated by means of the first outer element. An advantageous rigid connection between the first outer element and the inner element would be conceivable here. The connection can be a force-fit and/or form-fit connection or also a material-fit connection. A rotational movement of the first outer element can thus be transferred to the inner element.

Due to the advantageous rotational movement in conjunction with the contacting of the lip element on the inner surface of the filter screen, microplastic particles and fibers adhering to the filter screen are removed and ultimately collected in a lower area of the inner cavity.

According to a further preferred embodiment, the filter element can be removed from the housing. The filter element can thus advantageously be removed from the housing for cleaning purposes. The microplastic particles and fibers advantageously collected in the lower area of the inner cavity can thus be removed from the filter element in a simple manner. The housing of the filtration device comprises at least one receiving element, which is intended to receive and support the filter element. Furthermore, a locking mechanism is provided which fixes the filter element in the housing of the filtration device. Advantageously, the locking mechanism is provided between the outer element of the filter element and the housing of the filtration device.

According to a further preferred embodiment, the inner element is shaped helix-like. Advantageously, an outer contact surface of the helix-like inner element contacts an inner surface of the filter screen. Preferably, a second outer element is arranged on the housing. Preferably, the second outer element is shaped cup-like. Preferably, a rotation of the helix-like inner element conveys the filtered microplastic particles and fibers into the second outer element. Once the pumping process is complete, the microplastic particles and fibers are deposited on the inner surface of the filter screen. By bringing the outer contact surface of the helix-like inner element into contact with the inner surface of the filter screen, a large proportion of the microplastic particles and fibers deposited on the filter screen can be transported into the second outer element. Preferably, the second outer element can be removed from the filter element and the housing of the filtration device. This provides an extremely simple way of cleaning and emptying the filter element.

According to a further preferred embodiment, a drive device is provided by means of which the rotation of the helix-like inner element is driven. The drive device is operatively connected to the helix-like inner element by means of a transmission device. The drive device can be an electric motor, for example. The transmission device can be, for example, a gearbox, a shaft, a belt, or a similarly suitable transmission device.

Advantageously, the housing of the filtration device and the carrier structure of the filter element are made of a plastic. However, a design made of metal or a metal alloy would also be conceivable. Preferably, the filter screen of the filter element is made of microporous and hydrophobic plastic. The filter screen can be in the form of a solid body or mat. It would also be conceivable to design the filter screen as a fiber fleece.

The present task of the invention is also solved by a water-bearing household appliance comprising at least one tub and at least one filtration device, according to one of the embodiments described above. The household appliance can be equipped with all the features already described above in the context of the filtration device, either individually or in combination with one another, and vice versa.

Such a household appliance advantageously comprises a housing in which the at least one tub is arranged. Preferably, the filtration device is arranged in the housing of the household appliance. Preferably, the filtration device is provided in an upper region of the household appliance so that it is easily accessible for emptying. Preferably, the household appliance is a washing machine. However, a dishwasher would also be conceivable. The items to be washed are placed in the tub. During the washing process, a washing liquid in the form of water mixed with a treatment agent is then introduced into the tub.

Preferably, the water-bearing household appliance comprises a pump device which conveys water from the tub to the at least one filtration device. After or during the washing process, the wastewater is thus pumped out of the tub by means of the pump device. Advantageously, the first drain element is fluidically connected to the drain of the household appliance carrying the water. It is also conceivable that the first drain element is connected to the tub of the household appliance. The filtered water is drained from the first drain element by means of the pump device. Preferably, the second drain element is connected to a drain of the household appliance via a bypass line. Advantageously, an auxiliary pump device is provided in the second drain element and/or in the bypass line, by means of which the water can be conveyed from the second drain element or the filter element or the filtration device.

Furthermore, it is advantageous that the water-bearing household appliance comprises a control device that controls the filtration device. Preferably, the control device also controls other functions of the household appliance. Preferably, the control device controls the drive device of the filtration device. Advantageously, the drive device can be activated after completion of the pumping process so that the filtered microplastic particles and fibers are conveyed into the second outer element. Before the next pumping process, the filtered microplastic particles and fibers are thus removed from the filter screen.

Advantageously, the auxiliary pump device is not activated during the pumping process of the pump device, so that no water can be drained via the second drain element. Accordingly, the filtered water is advantageously only drained via the first drain element during the pumping process. Once the pump device has completed the pumping process, the auxiliary pump device is activated. Thus, after the end of the pumping process, the filtered water can advantageously only be drained off via the second drain element, as it no longer flows off via the first drain element.

According to a further preferred embodiment, at least one first sensor device is provided, by means of which an emptying requirement of the filter element can be detected. Preferably, at least one first sensor device is signallingly connected to the control device. Preferably, the control device transmits a signal to a warning device. The warning device can be an optical warning device, for example a light or an acoustic warning device.

According to a further preferred embodiment, the first sensor device comprises at least one sensor which detects a reduced flow rate through the filter element. For this purpose, a sensor could preferably be provided, by means of which a water level detection is preferably made possible in the second filter element. Alternatively, or cumulatively, a sensor can be provided which detects a differential pressure between the supply line element and the first and/or second drain element. Alternatively, or cumulatively, a sensor can be provided which detects the flow rate from the second drain element. Preferably, the emptying requirement is present when the flow rate falls below a threshold value. However, other sensors that can detect the need to empty are also conceivable. For example, a preferred sensor could be an optical sensor that can detect the presence of a certain amount of microplastic particles and fibers in the filter element.

According to another preferred embodiment, a second sensor device is provided which detects the opening state of the filter element. Preferably, the control device prevents the start of a washing program as long as the filter element is not closed. This ensures that a washing process can only take place with appropriate filtering.

Further advantages, objectives and features of the present invention are explained with reference to the following descriptions of the attached figures. Similar components may have the same reference signs in the various embodiments.

DETAILED DESCRIPTION

FIGS. 1 to 7 show a filtration device 1, in particular, for the filtration of microplastics for a water-bearing household appliance 100. The filtration device 1 comprises a housing 2 in which a filter element 3 is arranged, wherein the filter element 3 is designed in such a way that it encloses an inner cavity 4 which is fluidically connected to a supply line element 5, wherein a first drain element 6 is arranged along the height axis Z above the filter element 3, wherein a second drain element 7 is arranged along the height axis Z below the filter element 3.

Figure 19:
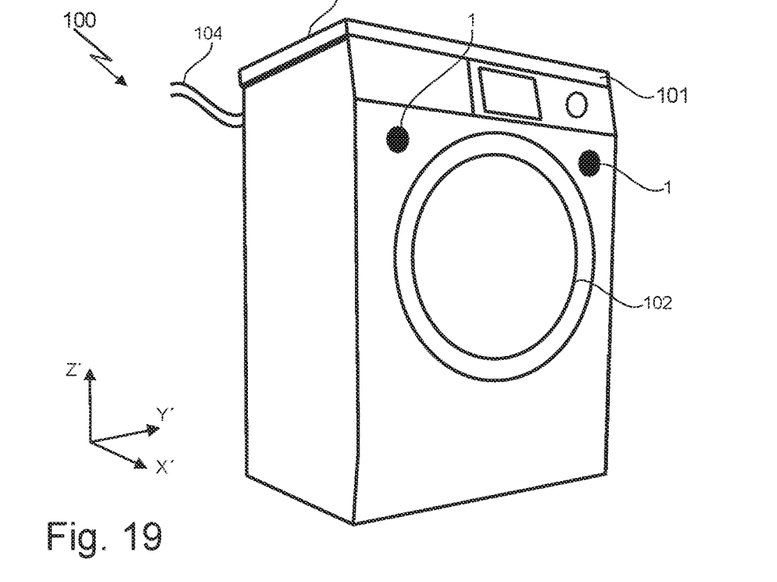
FIG. 19 household appliance comprising at least one air treatment device according to one embodiment.

The filtration device 1 extends along a height axis Z, a longitudinal axis X and a width axis Y. FIG. 19 shows a household appliance 100. This extends along a height axis Z', a longitudinal axis X' and a width axis Y'.

The filtration device 1 comprises a housing 2, which is essentially circular-cylindrical in shape. However, the design of the shape of the housing 2 is not intended to be restrictive of generality. Since the filtration device 1 is arranged inside the household appliance 100, the shape of the housing 2 of the filtration device 1 can be adapted to the respective conditions of the household appliance 100.

Figure 1A:
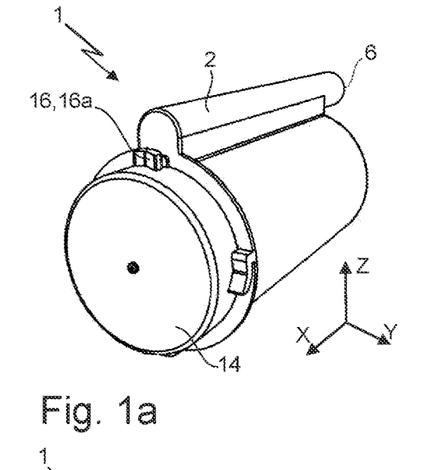
FIGS. 1a-1b perspective views of a filtration device according to one embodiment.
Figure 1B:
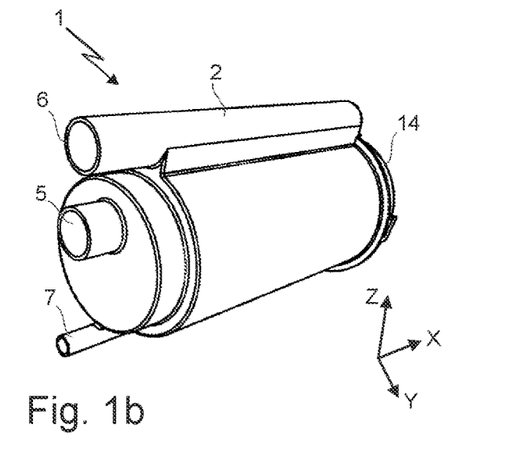
Figure 2:
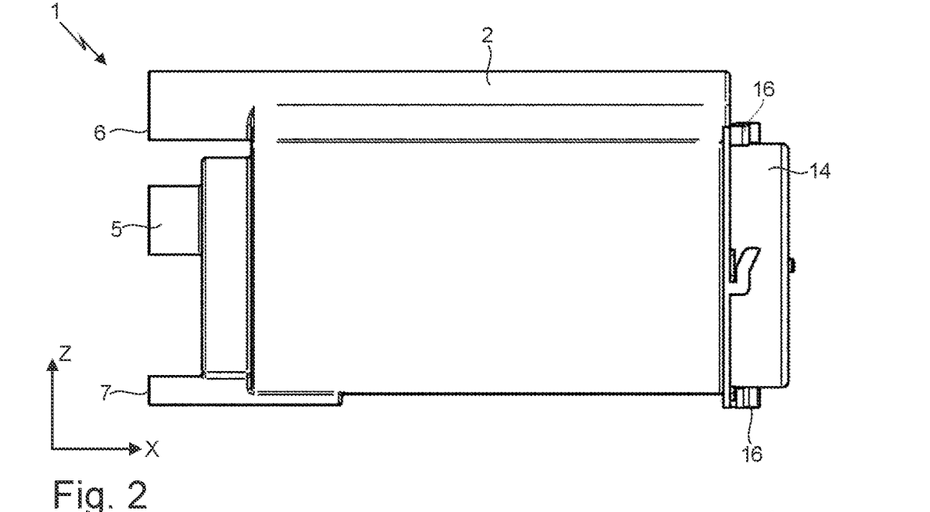
FIG. 2 a side view of a filtration device according to one embodiment.
Figure 3A:
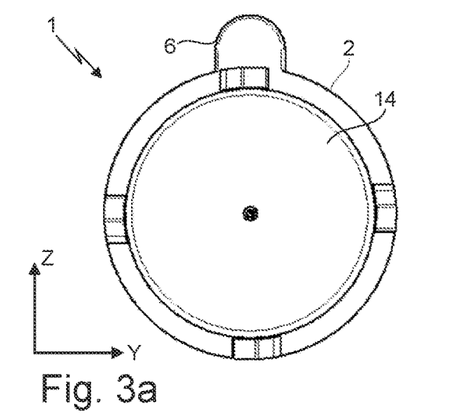
FIG. 3a a top view of a filtration device according to one embodiment from the front.
Figure 3B:
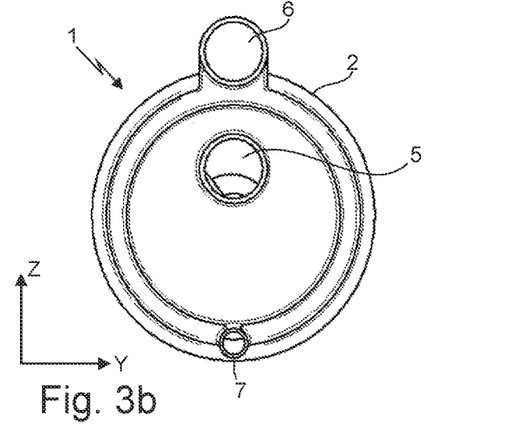
FIG. 3b a top view of a filtration device according to one embodiment from the rear.
Figure 4:
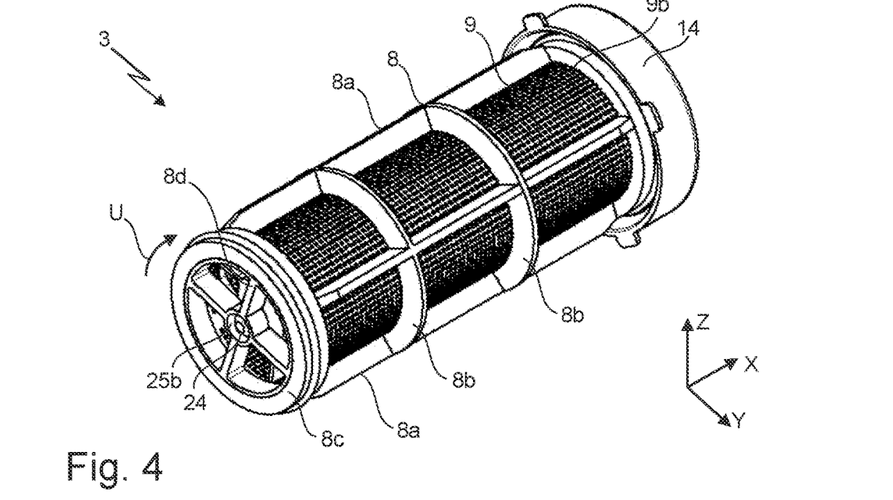
FIG. 4 a perspective view of a filter element according to one embodiment.

The housing 2 of the filtration device 1 extends along a height axis Z. Furthermore, a supply line element 5 is provided, which is arranged along the height axis Z between the first drain element 6 and the second drain element 7. The supply line element 5 can be integrated in the housing 2 or arranged thereon. Furthermore, it is suitable and intended for a supply line element 5, for example in the form of a hose or pipe, to be arranged on it. Both the first drain element 6 and the second drain element 7 can be integrated in the housing 2 or arranged thereon. Furthermore, these are suitable and intended so that a drain, for example in the form of a hose or pipe, can be arranged on each of them. FIG. 3b shows that the first drain element 6 and the second drain element 7 are diametrically opposed.

The first drain element 6 is suitable and intended to drain the filtered water only during a pumping process of the household appliance 100. The second drain element 7 is suitable and intended to drain the filtered water only after a pumping process of the household appliance 100 has ended. For this purpose, an auxiliary pump device 108 is provided, by means of which the water can be conveyed from the second drain element 7 or the filter element 3 or the filtration device 1.

Figure 5:
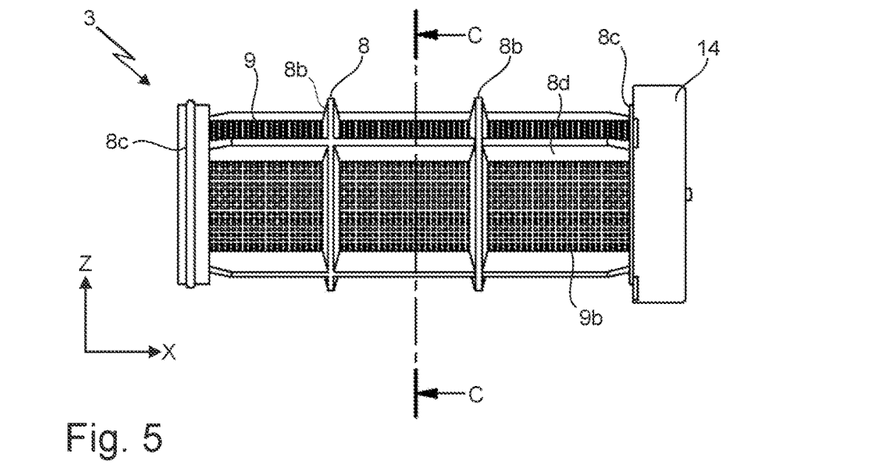
FIG. 5 a side view of a filter element according to one embodiment.
Figure 6:
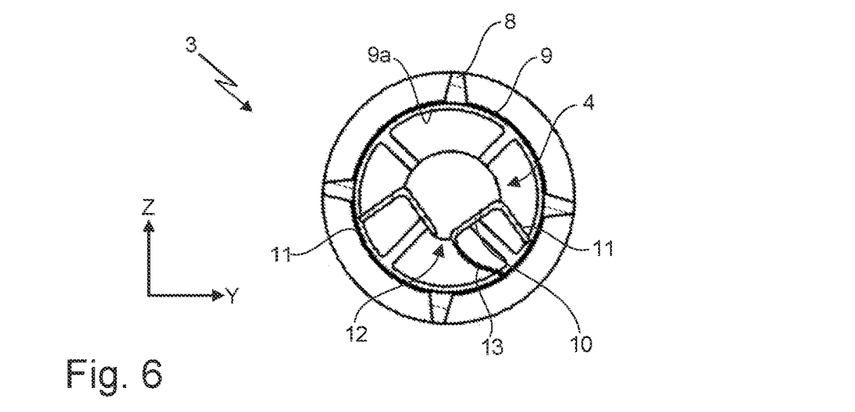
FIG. 6 a sectional view of a filter element according to one embodiment.
Figure 7:
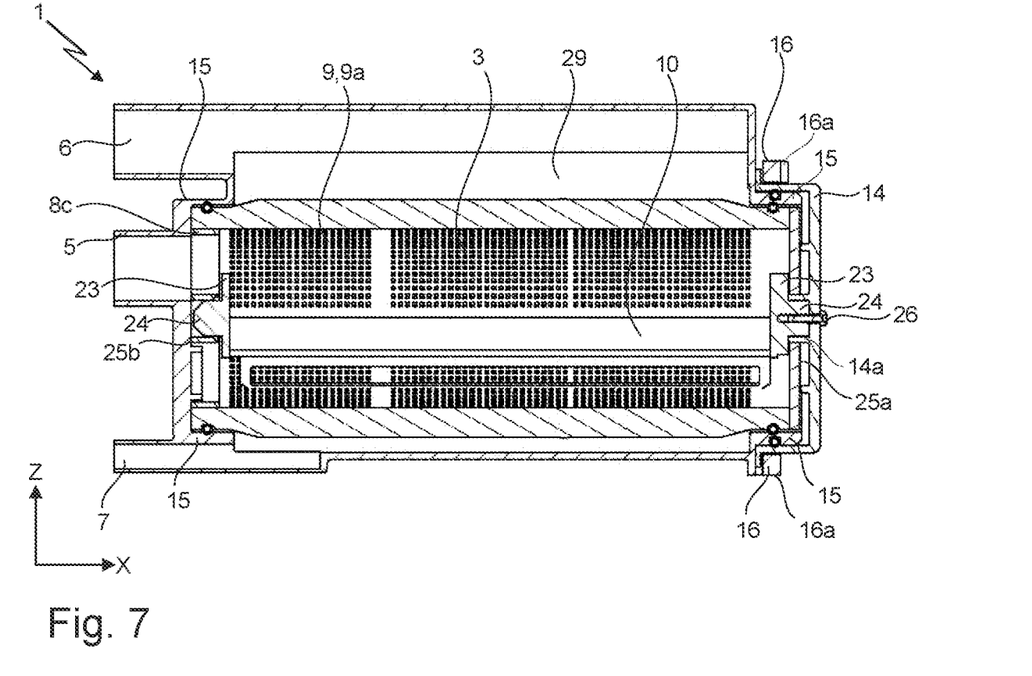
FIG. 7 a lateral sectional view of a filtration device according to one embodiment.
Figure 8:
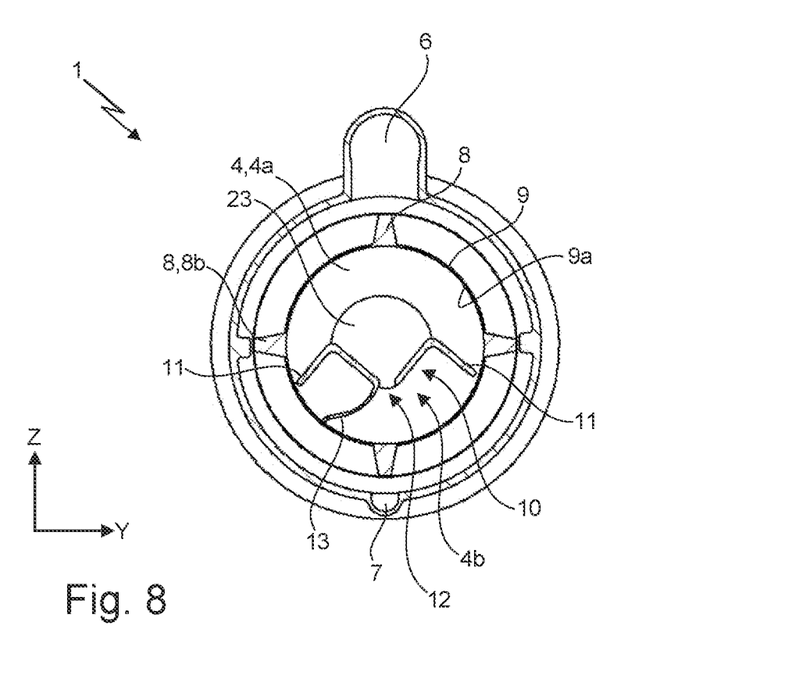
FIG. 8 a sectional view of a filtration device according to one embodiment.
Figures 9A, 9B:
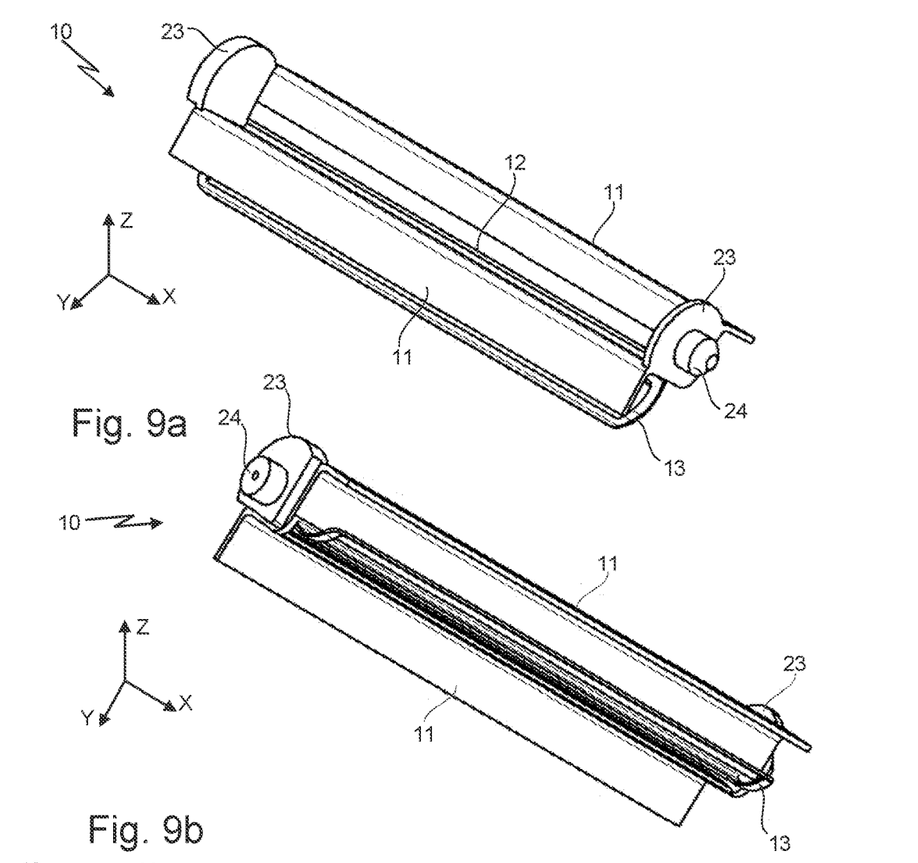
FIGS. 9a-9e different views of an inner element according to one embodiment.
Figure 9C:
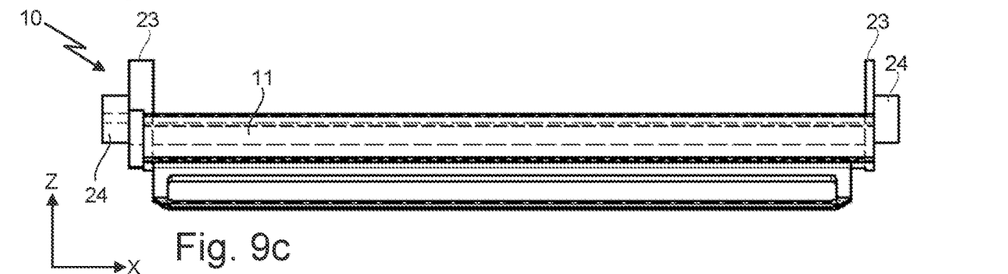
Figure 9D:
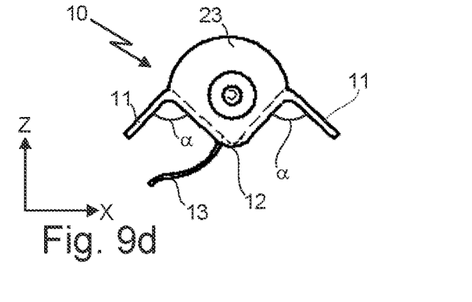
Figure 9E:
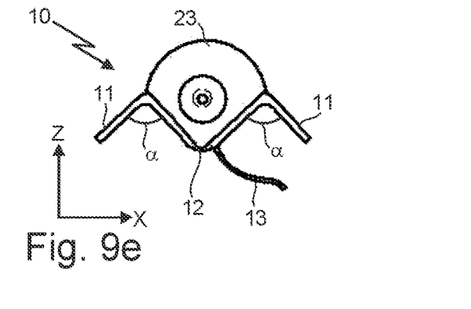

The first filter element 3 is essentially hollow cylindrical in shape. According to the embodiment shown here, the first filter element 3 has an essentially circular cross-section. However, other cross-sections would also be conceivable, for example elliptical or polygonal. The first filter element 3 has a carrier structure 8, on which at least one filter screen 9 is arranged. The inner cavity 4 is also defined by the hollow cylindrical design. FIGS. 5 and 6 clearly show the carrier structure 8. The carrier structure 8 comprises at least two first ribbed elements 8a extending along the longitudinal axis X and at least two second ribbed elements 8b extending along a circumferential direction U. The first ribbed elements 8a extend between two ring-like carrier elements 8c arranged along the longitudinal axis X. The first ribbed elements 8a and the second ribbed elements 8b are arranged on an outer surface 9b of the filter screen 9. The filter screen 9 is thus arranged radially further inwards than the first ribbed elements 8a and the second ribbed elements 8b. The inner surface 9a of the filter screen 9 defines the inner cavity 4. The water to be filtered from the supply line element 5 enters this inner cavity 4. The water passes through the filter screen 9. During the pumping process, the water then exits the first drain element 6 from the filtration device 1. After the pumping process, the water then exits the filtration device 1 from the second drain element 7.

An inner element 10 extending along a longitudinal axis X is rotatably arranged within the inner cavity 4, which at least in sections contacts the inner surface 9a of the at least one filter screen 9. Filtered microplastic particles and fibers 20 are collected by rotating the inner element 10. Two embodiments of the inner element 10 are shown here. The first embodiment is shown in FIGS. 1 to 11b. The second embodiment is shown in FIGS. 12 to 18.

According to the first embodiment, the inner element 10 comprises two angled elements 11 extending along the longitudinal axis X. The inner element 10 comprises an end piece 23 at each of its ends seen along the longitudinal axis X. The two angled elements 11 each open into the end pieces 23. The end pieces 23 are essentially circular segment-shaped and each comprise a rotary pin 24. The rotary pins 24 are each arranged rotatably in a receptacle 25a, 25b of the carrier structure 8. The receptacles 25a, 25b are each connected to the ring-like carrier elements 8c.

In the case of the ring-like carrier element 8c at the rear along the longitudinal axis X, the rear receptacle 25b is located in the opening of the ring-like carrier element 8c. At least one third ribbed element 8d is provided, which connects the ring-like carrier element 8c to the rear ring-like receptacle 25b. In the present case, two third ribbed elements 8d are provided, arranged crosswise within the opening of the ring-like carrier element 8c. The supply line element 5 is arranged along the height axis Z above the rear ring-like receptacle 25b. The water to be filtered can therefore enter the inner cavity 4 unhindered.

A disc-like first frontal element 27 is arranged on the ring-like carrier element 8c at the front along the longitudinal axis X. The first frontal element 27 seals the inner cavity 4. The first frontal element 27 rests on the ring-like carrier elements 8c from the front. The front receptacle 25a is provided as an aperture or hole in the first frontal element 27.

A first outer element 14 of the filter element 3 is rotatably arranged on the housing 2 of the filtration device 1. This first outer element 14 is connected to the inner element 10 in such a way that the latter can be rotated by means of the first outer element 14. In other words, the rotation of the inner element 10 can be driven by a rotation of the first outer element 14. Rotation of the first outer element 14 can be achieved, for example, by manual movement. In the present case, the outer element 14 comprises a cup-like receptacle 14a. This cup-like receptacle 14a projects into the front receptacle 25a or into the aperture or bore of the first frontal element 27 and at the same time accommodates the front rotary pin 24. This can be seen in FIG. 10. The cup-like receptacle 14a can be rotated relative to the front receptacle 25a. Furthermore, a connecting element 26 is provided, by means of which the outer element 14 is rigidly connected to the inner element 10, in particular to the rotary pin 24. The connecting element 26 can be a pin, a rivet, a screw or the like. Of course, other connections between the outer element 14 and the inner element 10 are also conceivable.

The angled elements 11 extend along the longitudinal axis X over essentially the entire length of the inner cavity 4. The angled elements 11 also extend along the width axis Y over essentially the entire width of the inner cavity 4. The angled elements 11 preferably end close to the inner surface 9a of the filter screen 9, but do not touch it. An angled element 11 comprises two legs that form an angle α. The angle α is in a range between 45° and 135°, preferably around 90°. A gap 12 is provided between the two angled elements 11. The gap 12 extends along the longitudinal axis X between the two end pieces 23 and distances the two angled elements 11 or the opposite legs of the two angled elements 11 along the width axis Y.

Figure 10:
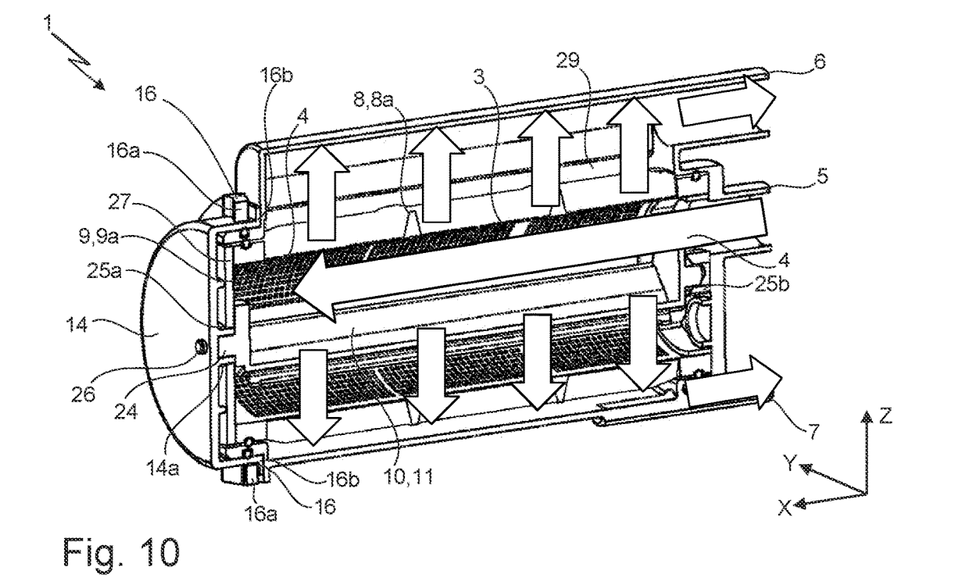
FIG. 10 a sectional view of a filtration device according to one embodiment.
Figure 11A:
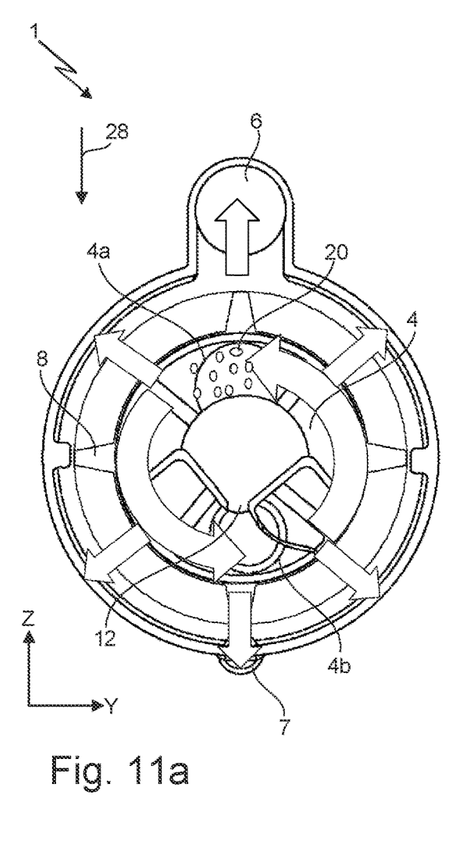
FIGS. 11a-11b sectional views of a filtration device according to one embodiment.
Figure 11B:
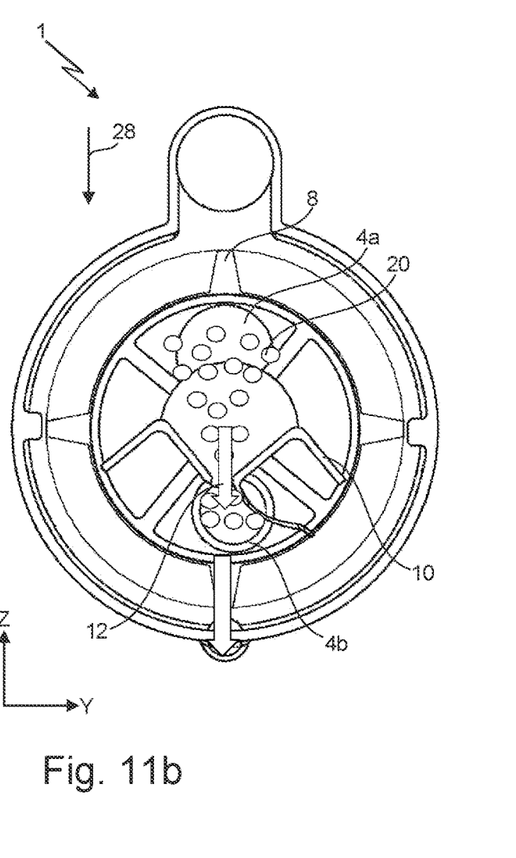
Figure 12:
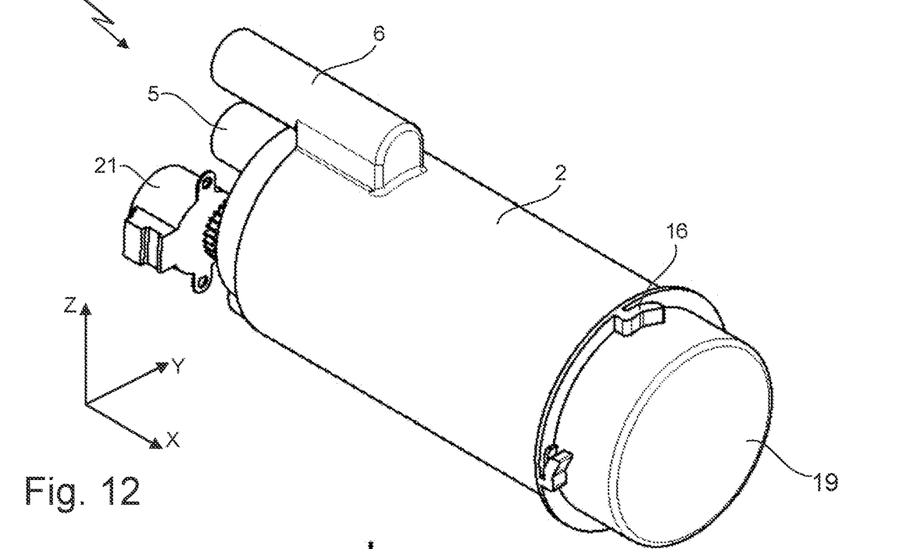
FIG. 12 a perspective view of a filtration device according to one embodiment.
Figure 13:
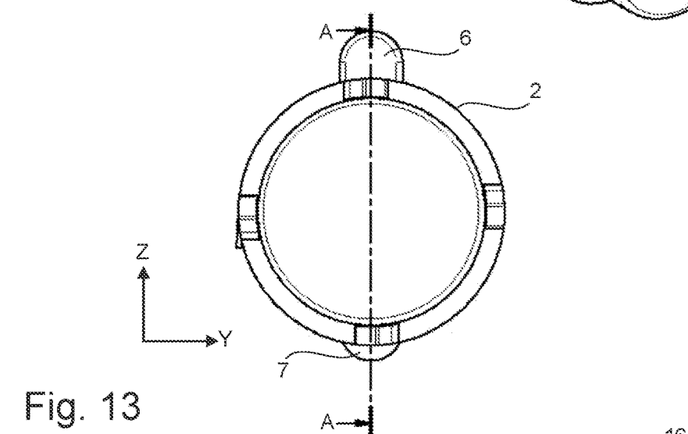
FIG. 13 a top view of a filtration device according to one embodiment.
Figure 14:
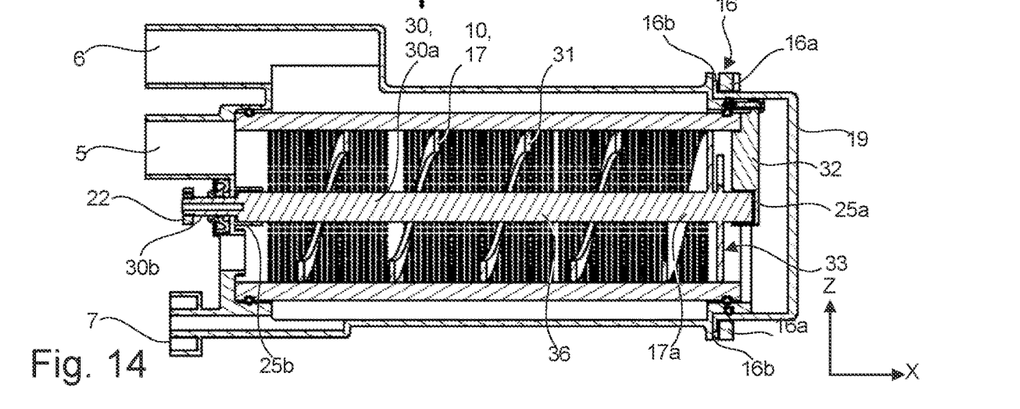
FIG. 14 a lateral sectional view of a filtration device according to one embodiment.
Figure 15:
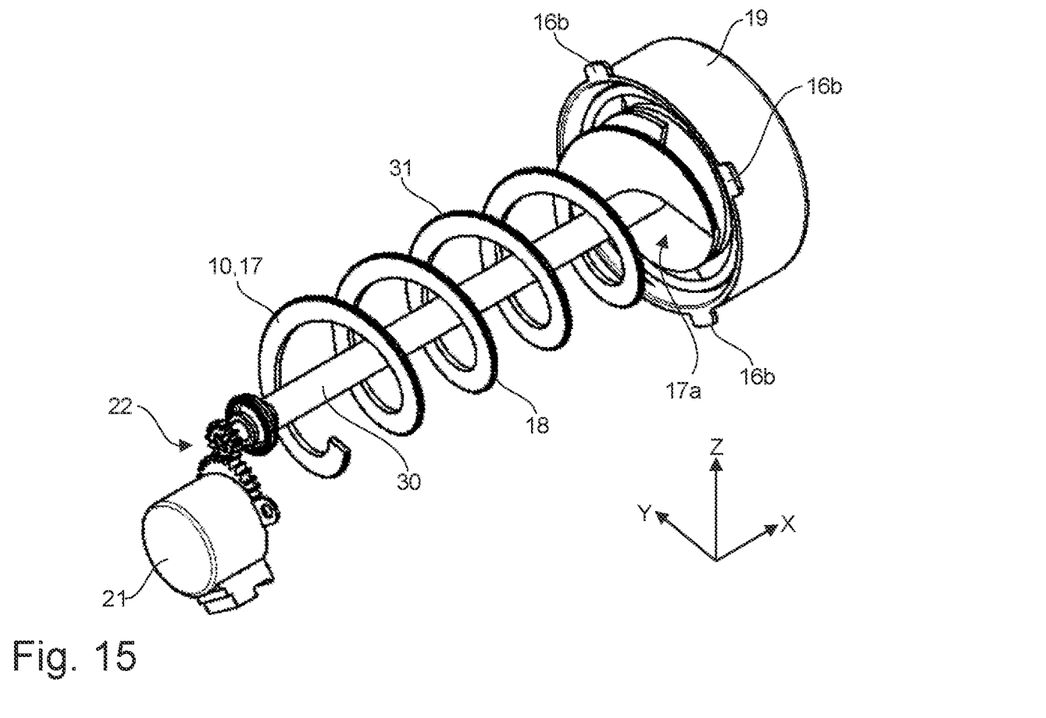
FIG. 15 a perspective view of an inner element according to one embodiment.
Figure 16:
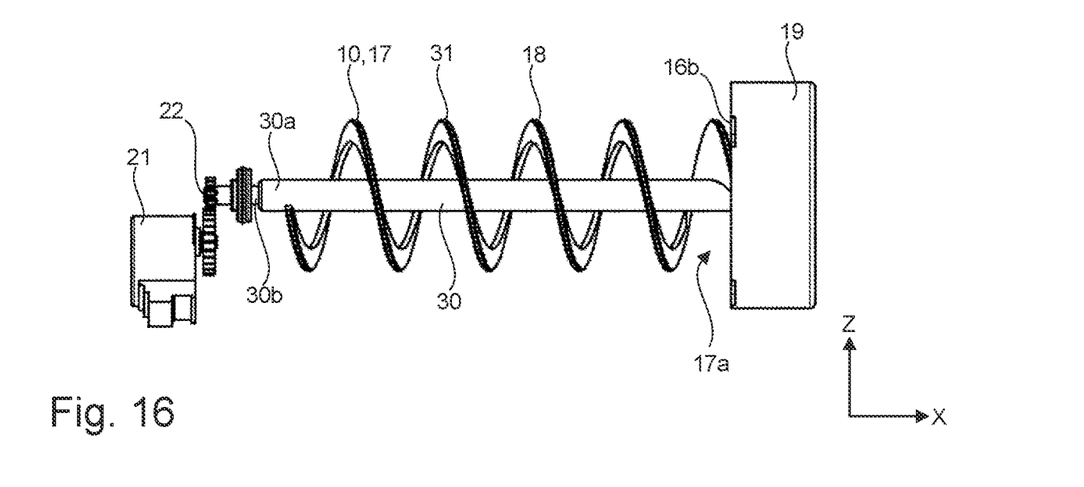
FIG. 16 a side view of an inner element according to one embodiment.

The inner element 10 separates the upper area of the inner cavity 4 into an upper area 4a and a lower area 4b. During the pumping process, the majority of the microplastic particles and fibers 20 are located in the upper area 4a of the inner cavity 4. The water passes radially outwards through the filter screen 9. This is shown in FIGS. 10 and 11a.

During the pumping process, the water only exits the filtration device 1 via the first drain element 6. At the end of the pumping process, the microplastic particles and fibers 20 pass through the gap 12 into the lower area 4b of the inner cavity 4. This is done by the effect of the gravitational force, shown in FIGS. 11a, 11b with arrow 28. The design of the angled elements 11 represents a kind of guide for the microplastic particles and fibers 20 towards the gap 12. Furthermore, after the pumping process is complete, the filtered water is drained through the second drain element 7, which is arranged along the height axis Z below the filter element 3. The microplastic particles and fibers 20 thus collect in the lower area 4b of the inner cavity 4. Due to the arrangement of the inner element 10 above the lower area 4b, the microplastic particles and fibers 20 are predominantly trapped in this area 4b. Even with a further pumping process, only a small portion from the lower area 4b of the inner cavity reaches the upper area 4a.

The inner element 10 further comprises a lip element 13, which contacts the inner surface 9a of the filter screen 9. The lip element 13 is essentially arched or double-arched in shape. Furthermore, the lip element 13 has a certain elasticity in order to ensure corresponding contact with the inner surface 9a of the filter screen 9. The lip element 13 extends along the longitudinal axis X along the entire longitudinal extent of the inner cavity 4.

By rotating the first outer element 14, the lip element 13 is moved along the inner surface 9a of the filter screen 9. As a result, the microplastic particles and fibers 20 adhering to the inner surface 9a are removed from it and collected in the lower area 4b.

The filter element 3 can be removed from the housing 2. For this purpose, the housing 2 of the filtration device 1 has at least one receiving element 15, in which the filter element 3 is accommodated. The receiving element 15 can be designed as a circumferential support surface on which the carrier elements 8c rest. Furthermore, the housing 2 has a mounting space 29 in which the filter element 3 is arranged. The mounting space 29 is fluidically connected to the first drain element 6 and the second drain element 7 and is otherwise watertight to the environment. The carrier elements 8c and/or the at least one receiving element 15 can further comprise sliding and/or latching elements, which facilitate removal and insertion and ensure a certain hold of the filter element 3.

Furthermore, a locking mechanism 16 is provided, which fixes the filter element 3 in the housing 2 of the filtration device 1. The present locking mechanism 16 comprises a locking latch 16a, which is arranged on the housing 2 or is integral therewith. A locking projection 16b, which is arranged on the outer element 14, can be arranged in this locking latch 16a or can be pushed in integrally with it by rotating the outer element 14. Preferably, the locking mechanism 16 comprises a plurality of locking latches 16a and a plurality of locking projections 16b. These are arranged distributed along a circumferential direction U of the outer element 14. The outer element 14 is essentially shaped cup-like. It comprises a disc-like first frontal element 27, on which a collar extending along the longitudinal axis X is formed. The locking projection(s) 16b is/are arranged on this collar. An angle of approximately 90° is provided between the collar and the locking projection 16b.

The locking mechanism 16 is unlocked by rotating the outer element 14. At the same time, such rotation moves the lip element 13 over the inner surface 9a of the filter screen 9. Once the microplastic particles and fibers 20 have been collected, the filter element 3 can be cleaned in a simple manner after removal. Thus, an extremely simple and effective emptying of the filtration device 1 can be provided.

A further embodiment is shown in FIGS. 12 to 18. Features of this filtration device 1, which correspond to those of the previously described embodiment, are not repeated in detail. Only the deviations are described below. The fundamental difference lies in the design of the inner element 10. The filter element 3 is essentially the same as in the previously described embodiment.

The inner element 10 is helix-like. The helix-like inner element 10, 17 is arranged in the inner cavity 4 in such a way that an outer contact surface 18 of the helix-like inner element 10, 17 contacts the inner surface 9a of the filter screen 9. The helix-like inner element 10, 17 comprises a rod-shaped shaft element 30, around which a helical element 31 winds. In a front section 17a of the helix-like inner element 10, 17 along the longitudinal axis X, the one helical element 31 is connected to the shaft element 30. The contact surface 18 is the outer edge of the helical element 31, which extends along a thickness of the helical element 31. This is in full contact with the inner surface 9a.

Furthermore, a second outer element 19 is arranged on the housing 2. This second outer element 19 is shaped cup-like. By rotating the helix-like inner element 10, 17, the filtered microplastic particles and fibers 20 located in the inner cavity are conveyed forwards along the longitudinal axis X to the second outer element 19 and finally into the second outer element 19.

Furthermore, a drive device 21 is provided, by means of which the rotation of the helix-like inner element 10, 17 is driven. The drive device 21 can, for example, be an electric actuator. The drive device 21 is operatively connected to the helix-like inner element 10, 17 by means of a transmission device 22. In the present case, the transmission device 22 is designed as a gearbox. Of course, other transmission devices 22 are also conceivable.

The shaft element 30 is mounted on a rear mounting 25b of the support structure 8. This rear receptacle 25b is cup-like in design and is connected to the rear ring-like carrier element 8c by means of at least one third ribbed element 8d. At its rear end along the longitudinal axis X, the shaft element 30 has a rear section 30b, which has a smaller diameter than the front section 30a. The rear section 30b protrudes through a hole in the cup-like receptacle 25b. A first gearwheel of the transmission device 22 is arranged on the rear section 30b, which meshes with a second gearwheel of the transmission device 22. The second gearwheel of the transmission device 22 is operatively connected to the drive device 21. Due to this arrangement, the shaft element 30 is mounted in the rear mount 25b. At the same time, the rotation of the shaft element 30 is driven via its rear section 30b. The supply line element 5 is arranged along the height axis Z above the rear receptacle 25b. The water to be filtered can therefore enter the inner cavity 4 unhindered.

The shaft element 30 is furthermore mounted in a front receptacle 25a. The front receptacle 25a is cup-like and is arranged in a second frontal element 32. The second frontal element 32 is connected to the front carrier element 8c. Furthermore, a passage opening 33 is provided in the second frontal element 32, through which the microplastic particles and fibers 20 are conveyed into the cup-like second outer element 19. Preferably, in a first position of the helix-like inner element 10, 17, a section of the helical element 31 covers the passage opening 33, so that virtually no water enters the second outer element 19 during the pumping process.

Figure 17:
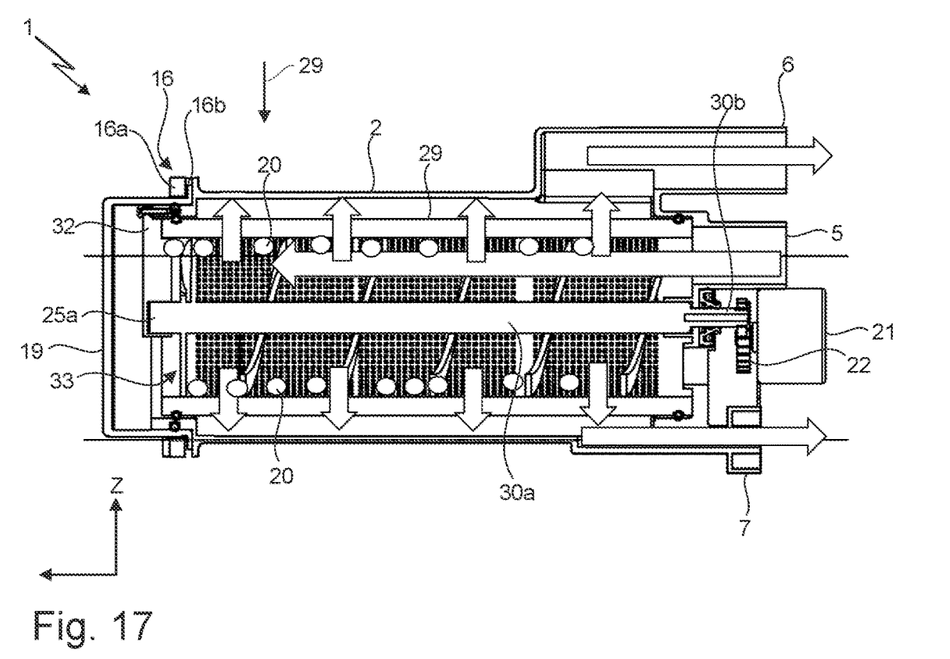
FIG. 17 a lateral sectional view of a filtration device according to one embodiment.
Figure 18:
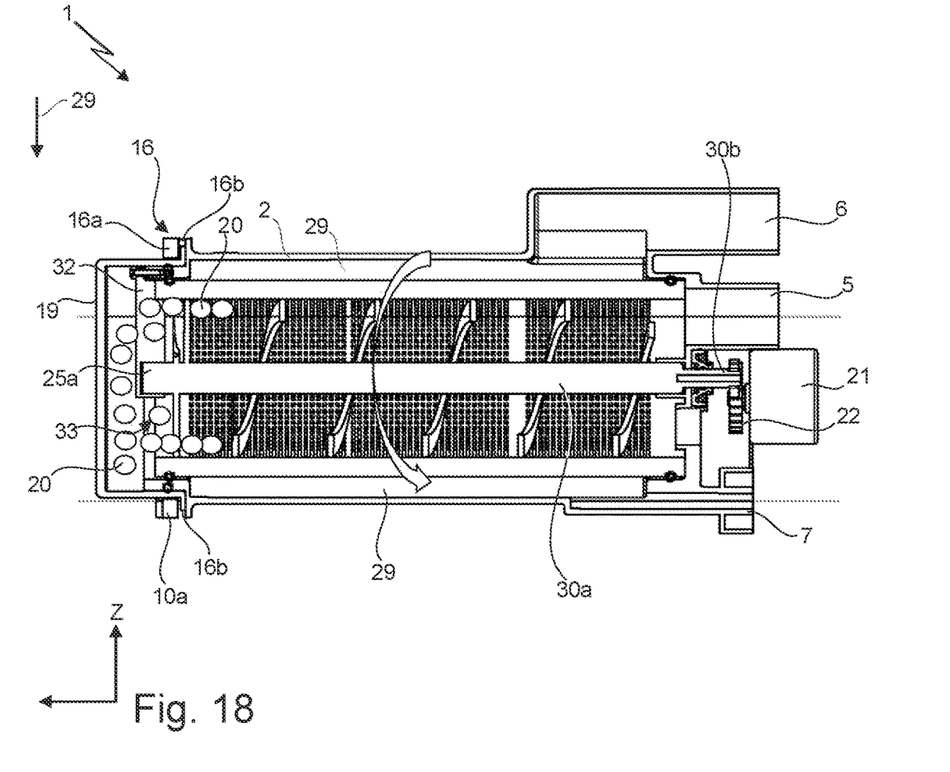
FIG. 18 a lateral sectional view of a filtration device according to one embodiment.

FIGS. 17 and 18 show the function of the filtration device 1. During the pumping process, the water to be filtered enters the inner cavity 4 and then flows radially outwards through the filter screen 9 into the mounting space 29. The water can only exit the filtration device 1 through the first drain element 6. Once the pumping process is complete, the water flows downwards to the second drain element 7 due to the gravitational force, whereby the filtered water can now be drained through this element. As soon as the water has escaped from the filter element 3, the microplastic particles and fibers 20 are deposited on the inner surface 9a of the filter screen 9. The majority of the microplastic particles and fibers 20 are deposited on the, along the height axis Z, lower inner surface 9a of the filter screen 9. By activating the drive device, the helix-like inner element 10, 17 performs a predetermined number of rotations. The microplastic particles and fibers 20 located in the inner cavity 4 are thus conveyed into the cup-like second outer element 19. Preferably, the helix-like inner element 10, 17 is returned to its first position after the predetermined number of rotations.

The cup-shaped second outer element 19 can be removed from the housing 2 in order to empty it. A locking mechanism 16 is provided, which fixes the filter element 3 in the housing 2 of the filtration device 1. The locking mechanism 16 comprises a locking latch 16a, which is arranged on the housing 2 or is integral with it. A locking projection 16b, which is arranged on the second outer element 19 or is integral therewith, can be pushed into this locking latch 16a by rotating the second outer element 19. Preferably, the locking mechanism 16 comprises a plurality of one locking latches 16a and a plurality of locking protrusions 16b. These are arranged distributed along a circumferential direction U of the second outer element 19. The second outer element 19 is essentially shaped cup-like. It comprises a disc-like first frontal element 27, on which a collar extending along the longitudinal axis X is formed. The locking projection(s) 16b is/are arranged on this collar. An angle of approximately 90° is provided between the collar and the locking projection 16b.

FIG. 19 shows a household appliance 100 in the form of a washing machine. The household appliance 100 comprises a housing 101 and a tub 102 provided therein. The housing 101 comprises a front side having a closure device for the tub 102, a display and control panel and a detergent drawer. The filtration device 1 is provided in an upper area of a front side of the housing 101 and is thus easily accessible to a user. Possible arrangements are shown in FIG. 19. The household appliance 100 preferably comprises only one filtration device 1.

The water-bearing household appliance 100 comprises a control device 105 which, among other things, controls the filtration device 1. Furthermore, the water-bearing household appliance 100 comprises a pump device 103, which conveys water from the tub 102 to the at least one filtration device 1. A supply line, which is connected to the supply line element 5, is provided for this purpose. The filtered water is also drained from the first drain element 6 by means of the pump device 103. The control device 105 also controls the pump device 103, as shown in the schematic diagram in FIGS. 20a and 20b. Furthermore, the first drain element 6 is fluidically connected to the drain 104 of the water-bearing household appliance 100 and/or the tub 102 by means of a first drain line. The second drain element 7 is connected to a drain 104 of the water-bearing household appliance 100 via a bypass line. An auxiliary pump device 108 is provided in the second drain element 7 and/or in the bypass line, by means of which the water can be conveyed from the second drain element 7 or the filter element 3 or the filtration device 1.

During the pumping process of the pump device 103, the auxiliary pump device 108 is not activated, so that no water can be drained via the second drain element 7. Accordingly, the filtered water is advantageously only drained via the first drain element 6 during the pumping process. After completion of the pumping process of the pump device 103, the auxiliary pumping device 108 is activated. Thus, after the end of the pumping process, the filtered water can advantageously only be drained off via the second drain element 7, as it no longer flows off via the first drain element 6.

Figure 20A:
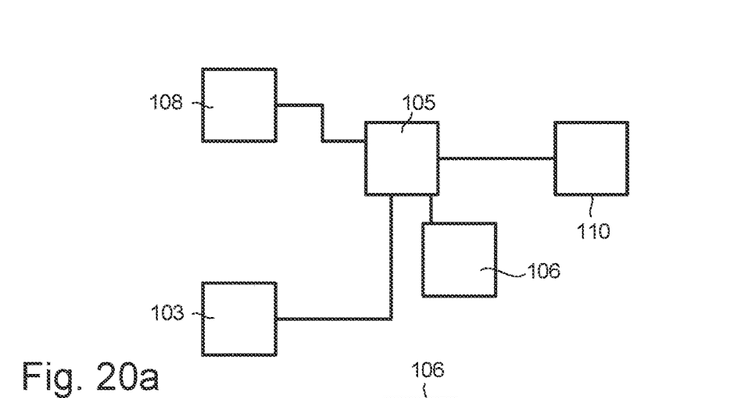
FIGS. 20a-20b schematic diagrams.
Figure 20B:
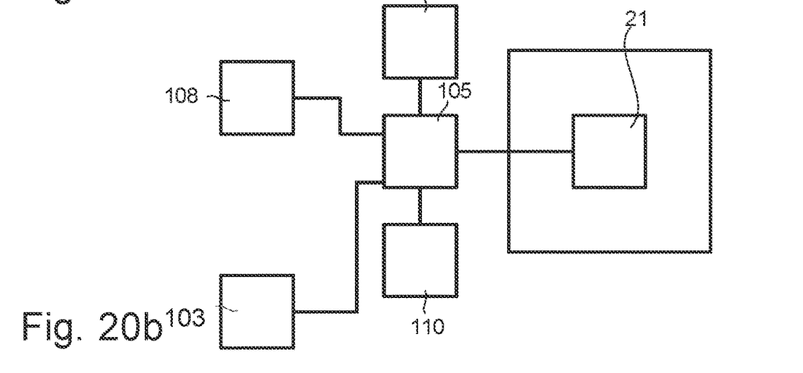

Furthermore, at least one first sensor device 106 can be provided, by means of which an emptying requirement of the filtration device 1 can be detected. This sensor device 106 can be designed in a variety of ways, for example a flow sensor can be provided which detects the flow through the second drain element 7 and/or the associated drain line. This could be useful in the embodiment according to FIGS. 1 to 11*b*. In the embodiment according to FIGS. 12 to 18, an optical sensor 106 could be provided which detects the amount of microplastic particles and fibers 20 in the second outer element 19. When the emptying requirement is detected, the control device 105 transmits a command to a warning device 110, which issues a warning to the user. FIG. 20*a* shows a schematic circuit diagram, which could be given for the embodiment according to FIGS. 1 to 11*b*. FIG. 20*b* shows a schematic diagram which could be given for the embodiment according to FIGS. 12 to 18. In this illustration, it can be seen that the control device 105 also controls the drive device 21. This is preferably done after the pumping process has been completed, and advantageously after the remaining water has exited through the second drain element 7. Preferably, the control device 105 controls the drive device 21 in such a way that a predetermined number of rotations of the helix-like inner element 10, 17 are performed.

The filtration device 1 achieves effective filtering of microplastic particles and fibers 20. Furthermore, the simple cleaning option of filtration device 1 eliminates the need for time-consuming replacement of microplastic filters.

The applicant reserves the right to claim all features disclosed in the application documents as being essential to the invention, provided that they are new, either individually or in combination, compared to the prior art. It should also be noted that the individual figures also describe features which may be advantageous in themselves. The skilled person immediately recognizes that a particular feature described in a figure can also be advantageous without the adoption of further features from this figure. Furthermore, the skilled person recognizes that advantages can also result from a combination of several features shown in individual figures or in different figures.

LIST OF REFERENCE SYMBOLS

1 Filtration device
2 Housing
3 Filter element
4 Inner cavity of the filter element
4*a* Upper area of the inner cavity
4*b* Lower area of the inner cavity
5 Supply line element
6 First drain element
7 Second drain element
8 Carrier structure
8*a* First ribbed elements
8*b* Second ribbed elements
8*c* Carrier elements
8*d* Third ribbed elements
9 Filter screen
9*a* Inner surface of the at least one filter screen
9*b* Outer surface of the at least one filter screen
10 Inner element
11 Angled elements
12 Gap
13 Lip element
14 First outer element
14*a* Cup-like receptacle
15 Receiving element
16 Locking device
16*a* Locking latch
16*b* Locking projection
17 Helix-like inner element
17*a* Front section of the helix-like inner element
18 Outer contact surface of the helix-like inner element
19 Second outer element
20 Microplastic particles and fibers
21 Drive device
22 Transmission device
23 End piece
24 Rotary pin
25*a* Front mounting of the support structure
25*b* Rear mounting of the support structure
26 Connecting element
27 First frontal element
28 Arrow
29 Mounting space
30 Shaft element
30*a* Front section of the shaft element
30*b* Rear section of the shaft element
31 Helical element
32 Second frontal element
33 Passage opening
100 Household appliance
101 Housing
102 Tub
103 Pump device
104 Drain of the household appliance
105 Control device
106 First sensor device
108 Auxiliary pump device
110 Warning device
U Circumferential direction
X Longitudinal axis of the filtration device
Y Width axis of the filtration device
Z Height axis of the filtration device
X' Longitudinal axis of the household appliance
Y' Width axis of the household appliance
Z' Height axis of the household appliance
α Angle

What is claimed is:

1. A filtration device for filtration of microplastics for a water-bearing household appliance, wherein the filtration device comprises a housing in which a filter element is arranged, wherein the filter element is configured to enclose an inner cavity which is fluidically connected to a supply line element, wherein a first drain element is arranged along a height axis Z above the filter element, and wherein a second drain element is arranged along the height axis Z below the filter element.

2. The filtration device according to claim 1, wherein the first drain element is configured for draining filtered water only during a pumping operation of the water-bearing household appliance, and wherein the second drain element is configured for draining filtered water only after the pumping operation of the water-bearing household appliance has ended.

3. The filtration device according to claim 1, wherein the filter element is essentially hollow-cylindrical in shape, wherein the first filter element has an essentially circular cross-section, and wherein the first filter element has a carrier structure on which at least one filter screen is arranged.

4. The filtration device according to claim 1, wherein an inner element extending along a longitudinal axis X is arranged rotatably within the inner cavity, which inner element contacts, at least in sections, an inner surface of at least one filter screen, and wherein filtered microplastic particles and fibers are collected by rotation of the inner element.

5. The filtration device according to claim 4, wherein the inner element comprises two angled elements extending along the longitudinal axis X, wherein a gap is provided between the two angled elements, wherein the inner element further comprises a lip element which contacts an inner surface of the at least one filter screen, a first outer element of the filter element being arranged rotatably on the housing of the filtration device, the first outer element being connected to the inner element in such a way that the inner element can be rotated by means of the first outer element.

6. The filtration device according to claim 1, wherein the filter element can be removed from the housing, wherein the housing of the filtration device comprises at least one receiving element configured to receive and support the filter element, and wherein a locking mechanism is provided which fixes the filter element in the housing of the filtration device.

7. The filtration device according to claim 4, wherein the inner element is helix-like, wherein an outer contact surface of the helix-like inner element contacts an inner surface of the at least one filter screen, wherein a second outer element is arranged on the housing, wherein the second outer element is cup-shaped, and wherein rotation of the helix-like inner element conveys the filtered microplastic particles and fibers into the second outer element.

8. The filtration device according to claim 7, wherein a drive device is provided, by means of which rotation of the helix-like inner element is driven, the drive device being operatively connected to the helix-like inner element by means of a transmission device.

9. A water-bearing household appliance comprising:
a housing;
at least one tub arranged in the housing; and
at least one filtration device according to claim 1, arranged in the housing.

10. The water-bearing household appliance according to claim 9, wherein the water-bearing household appliance further comprises a pump device which conveys water from the at least one tub to the at least one filtration device, wherein the first drain element is fluidically connected to the at least one tub, and wherein the second drain element is fluidically connected via a bypass line to a drain of the water-bearing household appliance.

11. The water-bearing household appliance according to claim 10, wherein the water-bearing household appliance further comprises a control device which controls the at least one filtration device.

* * * * *